March 21, 1961 R. F. LEARY ET AL 2,976,252
TEMPERATURE-STAGED CATALYST PRETREATMENT
Filed May 10, 1957
CONTINUOUS CATALYST PRETREATMENT, ETC.
(TEMPERATURE STAGING)
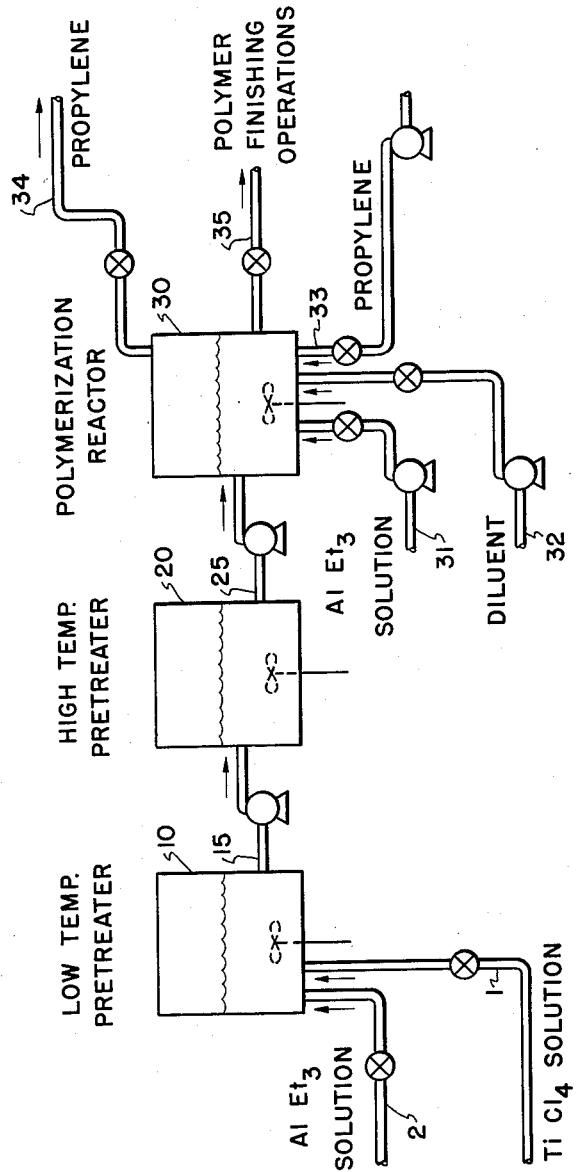
Robert F. Leary
Lewis W. Bowman     Inventors
Joseph M. Kelley, Jr.
By Peter H. Smolka    Attorney United States Patent Office 2,976,252
Patented Mar. 21, 1961

2,976,252
TEMPERATURE-STAGED CATALYST PRETREATMENT

Robert F. Leary, Cranford, Lewis W. Bowman, Westfield, and Joseph M. Kelley, Jr., Cranford, N.J., assignors to Esso Research and Engineering Company, a corporation of Delaware Filed May 10, 1957, Ser. No. 658,320

3 Claims. (Cl. 252—429)

This invention relates to a continuous process for polymerizing propylene or butene-1 with the aid of Ziegler catalysts. More particularly it relates to an improved temperature-staged continuous preparation of such catalysts for use in polymerizing such olefins.

The polymerization of propylene and higher olefins with the aid of Ziegler catalysts, e.g. combinations of aluminum alkyls and titanium tetrachloride, has been rapidly gaining in importance. However, unlike in similar polymerizations of ethylene, continuous propylene polymerizations have been heretofore handicapped by relatively low catalyst efficiencies and low polymerization rates since Ziegler catalysts using aluminum triethyl or the like as the reducing agent and prepared in a continuous system appeared to be substantially different from similar catalysts prepared batchwise. Because of this, it has been heretofore considered advisable to carry out continuous polymerizations of propylene with the aid of Ziegler catalysts prepared in individual batches. This, however, has been far from ideal because batch preparations tend to be inherently less economical than continuous ones and moreover the use of batch-prepared catalysts has tended to cause considerable variations in polymer product quality.

It is an object of the present invention to provide an efficient, completely continuous process for polymerizing propylene, butene-1 or the like with the aid of Ziegler catalysts. A more particular object is to provide an improved procedure for preparing active titanium halide-containing Ziegler catalysts on a continuous basis. These and other objects, as well as the general nature, scope and operation of the invention will become more clearly apparent from the subsequent description and examples. In the description it will be understood that all quantities and proportions of materials are expressed on a weight basis, unless indicated otherwise.

The attached drawing illustrates a typical embodiment of this invention.

It has now been discovered that highly effective Ziegler catalysts can be prepared from aluminum trialkyls and titanium tetrahalides in a continuous system, provided that the catalyst preparation or "pretreatment" is carried out in at least two stages at relatively low Al/Ti ratios and progressively increasing temperatures. For instance, desirable pretreatment conditions include Al/Ti ratios between about 0.3 and 0.8 to 1, the first catalyst pretreatment or mixing stage being carried out at a relatively low temperature, e.g. between 0° and 35° C., preferably 15° to 30° C., while in the consecutive pretreatment stage or stages the catalyst mixture may be maintained at more elevated temperatures, e.g. between 55° C. and 150° C., preferably 60° and 135° C.

At treatment temperatures below about 80° C. the precipitated active catalyst composite is brown or brown-black in color while at higher tempeartures, especially between about 110° and 145° C., a more crystalline, violet precipitate is formed. For instance, a suitable pretreatment schedule may involve maintaining a catalyst mixture of 0.5 mole AlEt$_3$ and 1 mole TiCl$_4$ in heptane for 30 minutes at 30° C., followed by another 30 minutes residence time at 65° C. in a second stage and finally by 1 hour at 120° C. in a last pretreatment stage. By contrast, when a similar continuous catalyst preparation is carried out at similar elevated temperatures throughout, either in a single stage or in a plurality of stages, it appears that some of the titanium halide is greatly overreduced to a relatively inactive black dihalide form while another portion of the original titanium tetrahalide is not reduced at all or at least not to a sufficiently low valence state. In general, it is preferable to have the active catalyst in a valence state corresponding to TiCl$_3$ or preferably in a subtrivalent mixed valence state having on the average at least about 2.1 atoms of chlorine present per atom of titanium.

More specifically the present invention is applicable to the continuous preparation of catalysts wherein a reducible heavy metal compound such as titanium tetrachloride or tetrabromide, vanadium oxychloride, or the corresponding zirconium compounds are reduced by aluminum triethyl or similarly potent trialkyl compounds containing from 2 to 4 carbon atoms per alkyl group, e.g. aluminum triisobutyl. Less potent reducing agents such as aluminum trioctyl or aluminum diethyl chloride or the like may be used in the high temperature stages of this invention in order to minimize the danger of overreduction. For instance, the catalyst mixture in the low temperature stage may consist of 0.2 mole of AlEt$_3$ per mole of TiCl$_4$, whereas in the high temperature stage the Al/Ti ratio may be increased to 0.6 or 0.8 by supplemental addition of a suitable amount of aluminum trioctyl.

Of course, as is otherwise well known in the art, the aforementioned metal compounds are reacted while dissolved in an inert solvent, e.g. an inert C$_5$ to C$_{12}$ hydrocarbon such as isopentane, n-heptane, n-dodecane, highly refined (acid treated) kerosene, cyclohexane methylcyclohexane, decalin, benzene, toluene, xylene, etc. Where high polymer crystallinity and good polymerization rate are desired, the paraffinic solvents are preferred. However, naphthenic solvents, e.g. methylcyclohexane, may often be preferred when maximum reaction rates are desired while aromatics, e.g. xylene, give more crystalline products but at lower reaction rates. While preparing the catalyst, it is important to mix the solutions of the two metal compounds in a ratio of about 0.1 to 0.8 atom of Al per atom of Ti in a low temperature stage. After the low temperature treatment the catalyst mixture is treated in the high temperature stage, still at the aforesaid low Al/Ti ratio. However, this ratio is desirably increased to a range between about 1.0/1 and 3/1 shortly prior to or during the actual polymerization by adding a supplemental amount of the aluminum trialkyl or dialkyl halide which tends to activate the precipitated reduced titanium halide. In the catalyst preparation stages it is desirable to have the metal compounds present in a concentration of about 0.6 to 5%, preferably about 0.75 to 1.5%. At lower concentrations the desired catalyst reaction is apt to be too slow while at higher concentrations the resulting catalyst slurry becomes increasingly difficult to handle.

In the catalyst preparation as well as the polymerization it is desirable to use solvents and reagents essentially free of impurities such as oxygen, moisture, sulfur, certain aromatics, acetylenes, etc., since these tend to poison the catalyst or affect polymer quality. For instance, oxygen and water in the reaction diluent are desirably held to less than 5 p.p.m. as they not only tend to poison the catalyst but also convert a portion of the catalyst into insoluble compounds that cause an increase in the ash content of the polymer product. Except where some specific product modification is intentionally desired, the feed olefin or olefins also should be substantially free of homologous olefins as these may have a substantial effect on product quality. On the other hand, substantial amounts of paraffins may be tolerated in the olefin feed stream without harm. Thus, essentially the same results can be obtained when using technical grade propylene containing as much as 5% or even 10% propane, as when pure propylene is used in the polymerization. Purification of the solvents and feed olefins may be effected by fractional distillation, distillation in the presence of metallic sodium, percolation through activated silica or alumina, the solvent may be scrubbed with aluminum alkyl solutions, etc. Of course, the catalyst preparation as well as the olefin polymerization is desirably carried out in an inert, oxygen-free atmosphere, which can be achieved by flushing the pertinent equipment with nitrogen, methane or similar dry inert gases.

The individual catalyst mixing stages may have the form of conventional agitated mixing vessels of relatively large diameter, which may be provided with wall scraping devices for removing any sticky catalyst from the walls. Alternately, the mixing stages may have the form of individual high-velocity circulatory systems in which the mixed catalyst components circulate for a predetermined time until they are passed to the successive mixing stage and finally to the polymerization zone. Total holding time in each catalyst mixing stage depends somewhat on the specific nature and proportion of the catalyst components as well as reaction temperature. It may vary between about 1 to 90 minutes, preferably 15 to 60 minutes, in the low-temperature stage and about 5 to 120 minutes, preferably 30 to 90 minutes, in the high temperature stage or stages. Optimum holding times will generally be those that will cause reduction of only a part of the titanium tetrahalide and a corresponding conversion of essentially all of the aluminum trialkyl to the corresponding aluminum dialkyl halide in the first, low temperature stage. This is then followed by reduction of essentially all of the titanium halide present to an average valence between 2.1 and 3 and a corresponding conversion of the aluminum dialkyl halide to the alkyl dihalide, etc. in the high temperature stage. At high enough temperatures the aluminum dialkyl halide formed in the first stage may even be reduced to aluminum trichloride in the later stages. At any rate, however, a limited number of preliminary tests will readily determine the optimum conditions in any particular case.

In the polymerization stage it is desirable to operate at relatively low catalyst concentrations, e.g. about 0.1 to 0.5%, based on total liquid present, although as little as 0.001% of catalyst based on olefin is sufficient if the feed is pure. Increasing catalyst concentrations tend to depress the molecular weight of the polymer product. Accordingly, unless the polymerization stage is operated at relatively low conversions, in order to allow easy handling of the polymerized mixture suitable amounts of inert diluent of the aforementioned kind are also fed into the polymerization reactor in addition to the olefin feed and the aforementioned supplemental amount of aluminum alkyl. The polymerization is generally carried out at low pressures, e.g. 0 to 500 p.s.i.g., preferably 0–50 p.s.i.g., and temperatures of about 0° to 100° C., preferably about 40° to 75° C. The polymerization mixture desirably contains about 2 to 20%, preferably 3 to 5%, olefin monomer when operating at 20° to 50° C.

After the required residence time, e.g. 20 to 180 minutes, the reaction mixture may be passed from the polymerization reactor in conventional manner to a quench tank where it is mixed with a $C_1$ to $C_8$ alkanol, e.g. methanol, n-butanol or isooctyl alcohol, the resulting precipitated solid polymer is filtered from the organic liquid, washed with methanolic hydrochloric acid solution, an alcoholic solution of a chelating agent such as acetyl acetone or the like to remove catalyst residues, dried, compacted and packaged. The polymer typically has a molecular weight between about 20,000 and 1 million, as determined from intrinsic viscosity measurements of its solutions. Polymers in the 50,000 to 150,000 molecular weight range generally are considered as possessing a particularly attractive balance of properties.

This invention will next be illustrated by a specific example.

Referring to the attached drawing, a n-heptane solution containing 8.6 g. of $TiCl_4$ per liter is fed into low temperature pretreater 10 via line 1 at a rate of 100 parts per hour. Similarly a n-heptane solution containing 2.6 g. of aluminum triethyl ($AlEt_3$) per liter is fed into the same vessel 10 via line 2 at a rate of 100 parts per hour. As a result, the mixture in vessel 10 contains 0.76% of the total metal compounds in heptane, the metal compounds being present in a ratio corresponding to 0.5 atom of aluminum per atom of titanium. The mixture is maintained and agitated in vessel 10 at a temperature of 28° C. for an average residence time of 50 minutes, by which time essentially all of the aluminum triethyl is converted to diethyl aluminum chloride. Next the mixture is pumped at a rate of 200 parts per hour via line 15 into high temperature treater 20. Here it is maintained with agitation at a temperature of 70° C. for an average residence time of another 50 minutes, so as to reduce essentially all of the titanium tetrachloride to a metal valence of less than 3.

From vessel 20 the catalyst mixture is pumped via line 25 into polymerization reactor 30 at a rate of about 200 parts per hour. Also being pumped into reactor 30 is a supplemental amount of aluminum triethyl, heptane diluent and propylene monomer. More specifically, additional 2.6 g./l. solution of aluminum triethyl in n-heptane is fed into reactor 30 via line 31 at a rate of 150 parts per hour, while 750 parts per hour of additional n-heptane diluent are fed via line 32, and 100 parts per hour of technical grade propylene (95% propylene, 5% propane) are fed via line 33. As a result, the Al/Ti ratio in reactor 30 is about 2:0, the metal compound catalyst concentration is 0.27% and propylene monomer concentration in the solution is about 4%. After maintaining this mixture with agitation in reactor 30 at 50° C. and atmospheric pressure for an average residence time of 60 minutes, the resulting polymerized mixture is withdrawn therefrom via line 35 at a rate of about 1200 parts of liquid per hour. A small amount of unconverted propylene gas is withdrawn via line 34 and may be recycled. The withdrawn polymerization mixture is quenched in the usual manner (not illustrated) with n-butanol at a rate of about one part of the alcohol per part of polymerized mixture, the precipitated polymer is washed with a 90% methanol-10% concentrated hydrochloric acid mixture and dried by passage through a dewatering extruder and finally a vacuum drying extruder.

In this manner a polymer yield of 37 parts per hour per part of catalyst was obtained. The polymer had a molecular weight of about 117,000.

For comparison, the aforementioned continuous polymerization run was repeated under identical conditions, except that the catalyst was prepared in accordance with conventional practice. More specifically, the titanium tetrachloride and aluminum triethyl solutions were fed into catalyst preparation vessel 10 as before, except that the resulting mixture was maintained therein at a temperature of 70° C. for an average residence time of 100 minutes, whereupon it was pumped from tank 10 directly into polymerization vessel 30 for use in the polymerization. In other words, the low temperature pretreatment of this invention was omitted. As a result, in this run the polymer was formed at a rate of only 20.0 g./hour/g. catalyst. The polymer had a molecular weight of about 107,000 and was substantially similar to the one obtained in the run employing the novel temperature staged catalyst preparation.

It is thus seen that under comparable conditions the reaction rate is nearly doubled when the catalyst is prepared in the staged temperature pretreatment of this invention, as compared with the more or less isothermal pretreatment of the prior art.

Of course, instead of using a two-stage catalyst pretreatment system, a greater number of stages can be used. For instance, the catalyst preparation can be effected in a narrow pipeline, keeping the initial portion thereof at temperature below 35° C. for a length sufficient to permit the desired substantially complete conversion of the potent aluminum trialkyl compound into the less potent aluminum alkyl halide, and keeping a later portion of the pipeline at temperatures above 60° C. Alternatively, the initial catalyst pretreatment stage may be effected in a centrifugal or piston pump maintained at a suitably low temperature. In any event, however, it is important that the mixing of the catalysts components is arranged in such a manner that the potent fresh aluminum trialkyl compound is contacted at low temperature and more or less exclusively with fresh unreduced titanium tetrachloride rather than with any titanium trichloride that may have already formed in the catalyst mixture; otherwise an undesirable over-reduction of the titanium trichloride tends to take place. For this reason the mixing stage should have the $TiCl_4$ and $AlEt_3$ inlets located close together.

Having described the general nature of the invention and illustrated it by a specific example, its novelty is particularly pointed out in the appended claims.

The claimed invention is:

1. A continuous process for making a normal $C_3$–$C_4$ alpha monoolefin polymerization catalyst which comprises continuously agitating a mixture consisting essentially of an aluminum trialkyl, the alkyl group having from 2–4 carbon atoms and a titanium tetrahalide selected from the group consisting of titanium tetrachloride and titanium tetrabromide in a hydrocarbon solution to give a mixture having an Al/Ti ratio of about 0.1/1 to 0.8/1, maintaining the mixture in a first pretreatment zone at a temperature between about 0° and 35° C. and an average residence of about 0.1 to 60 minutes, continuously passing the resulting liquid mixture to at least one subsequent pretreatment zone, and maintaining the mixture in said subsequent pretreatment zone at a temperature of about 55° to 150° C. for an average residence of about 5 to 120 minutes until substantially all titanium is reduced to a valence ranging from about 2.1 to 3.

2. A process according to claim 1 wherein the aluminum alkyl is aluminum triethyl and the titanium halide is $TiCl_4$.

3. A process according to claim 1 wherein the catalyst concentration in the mixture is about 0.6 to 5.0%, and the hydrocarbon solvent is a $C_5$ to $C_7$ paraffin.

References Cited in the file of this patent

UNITED STATES PATENTS

| | | |
|---|---|---|
| 2,406,869 | Upham | Sept. 3, 1946 |
| 2,440,498 | Young et al. | Apr. 27, 1948 |
| 2,728,758 | Field et al. | Dec. 27, 1955 |
| 2,731,452 | Field et al. | Jan. 17, 1956 |
| 2,839,518 | Brebner | June 17, 1958 |
| 2,845,414 | Schutze | July 29, 1958 |
| 2,874,153 | Bowman et al. | Feb. 17, 1959 |
| 2,889,314 | Fritz | June 2, 1959 |
| 2,890,187 | Bowman et al. | June 9, 1959 |

FOREIGN PATENTS

| | | |
|---|---|---|
| 538,782 | Belgium | Dec. 6, 1955 |
| 1,139,806 | France | Feb. 18, 1957 |